Feb. 29, 1944.   O. E. ESVAL   2,342,655
GYRO COMPASS
Filed May 6, 1942   2 Sheets-Sheet 1

INVENTOR
ORLAND E. ESVAL
BY
*Herbert R. Thompson*
his ATTORNEY.

INVENTOR
ORLAND E. ESVAL
BY
Herbert N. Thompson
his ATTORNEY.

Patented Feb. 29, 1944

2,342,655

UNITED STATES PATENT OFFICE 2,342,655

GYROCOMPASS

Orland E. Esval, Merrick, N. Y., assignor to Sperry Gyroscope Company, Inc., Brooklyn, N. Y., a corporation of New York Application May 6, 1942, Serial No. 441,975

8 Claims. (Cl. 33—226)

This invention relates to gyro compass instruments and particularly concerns an electromagnetic coupling means for controlling a free gyro by which the same is given direction seeking properties.

One of the features of the invention is to provide a coupling means of this noted character that is simultaneously effective to damp the gyro compass instrument.

Another feature of the invention consists in the double wound stator of the electromagnetic couple which produces two separate parallel flux fields rotating in opposite directions.

Still a further feature of the invention is contained in the provision of a unitary displaceable inductor member which links the stator and is normally situated in an ineffective position midway between the spaced flux fields of the stator.

Still another feature of the invention is to provide a coupling means for controlling a gyro instrument by which the ratio of the torque forces exerted thereby about both the horizontal and vertical axes of the gyro remains constant.

A further feature of the invention resides in the provision for stabilizing the stator frame of the instrument by means of a gyro vertical.

Other features and structural details of the invention will be apparent from the following description when read in connection with the accompanying drawings, wherein Fig. 1 is a side elevation of the improved gyro compass instrument with the casing illustrated in section to show the working parts.

Figure 1:
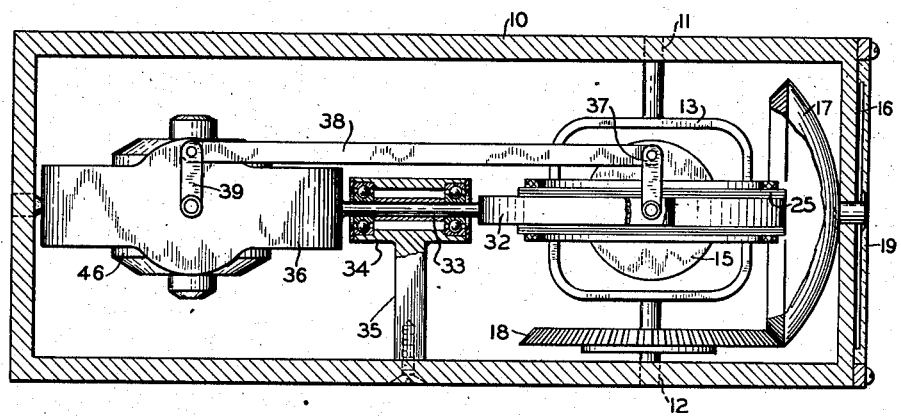
Figure 2:
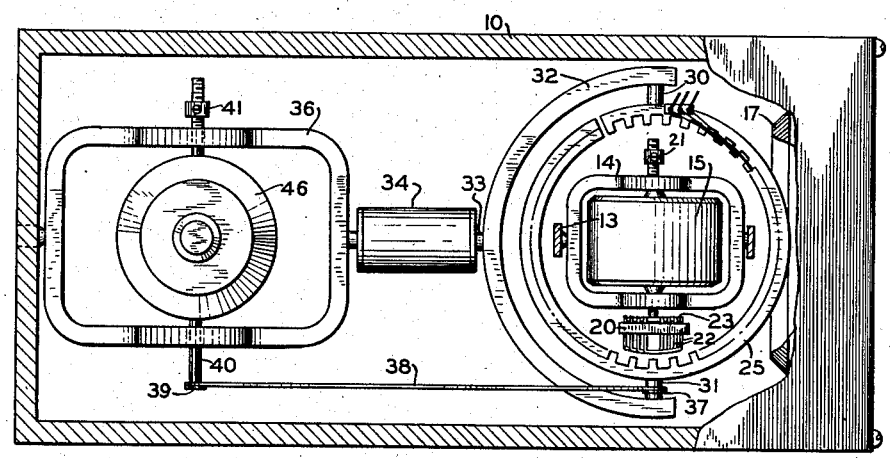
Fig. 2 is a plan view of the form of instrument shown in Fig. 1.

With particular reference to Figs. 1 and 2, a gyro compass constructed to embody the present inventive concepts is shown enclosed in a casing 10 which provides upper and lower bearings respectively indicated at 11 and 12 in which the trunnions of a vertical ring 13 are journaled. The ring is a single part of the conventional free gyro instrument illustratively employed in the drawing to aid in the description of the invention, the instrument further including a rotor bearing frame 14 which is pivotally mounted in the usual fashion between the upwardly extending arms of the ring 13. The gyro rotor is mounted to spin on a normal horizontal axis perpendicular to the axis of the frame and is designated at 15. Any suitable means may be provided to spin the rotor 15, but inasmuch as the present invention is not particularly concerned with this feature, the same has not been specifically illustrated. The gyro is consequently provided with vertical and horizontal axes of freedom provided by vertical ring 13, within which the rotor bearing frame 14 is pivoted on horizontal axis 14', 14'. A directional indication is obtained from the disclosed instrument by a vertical compass card 16, which is turned through a crown gear 17 and meshing bevel gear 18 secured to the vertical ring 13 of the gyro. A suitable lubber line which may be on the glass face 19 of the instrument but which is not shown in the drawings is compared with the card 16 to determine the course or heading.

To provide a free gyroscope with direction seeking properties, I utilize in lieu of the conventional pendulous or gravitational factor, an electromagnetic coupling means in the form of a two-part inductive means, one part mounted on the gyroscope and the other part universally and independently mounted, one part being in the form of an inductor and the other a two-part coil member. The inductor member is shown as rigidly mounted on the frame 14 in a position to tilt with the same as it moves about its horizontal axis in the ring 13. The inductor element is generally indicated at 20, the same being suitably insulated from the frame and being counterbalanced by means of an adjustable weight 21. The flux linking portion of the movable inductor element is specifically shown in the drawings as formed of four separate rods or wires 22 of conducting material which extend outwardly from the holding plate or base, which is preferably of insulating material. To the rear of such plate the outer ends of each rod are electrically connected or short-circuited by means of cross wires 23. For the purposes of the present invention, the four inductor rods 22 are considered to be a single inductor element. However, it is pointed out that any suitable member of such flux linking inductors may be employed to obtain any desired torque to effect precession of the gyro in accordance with the teaching of the present invention.

Figure 3:
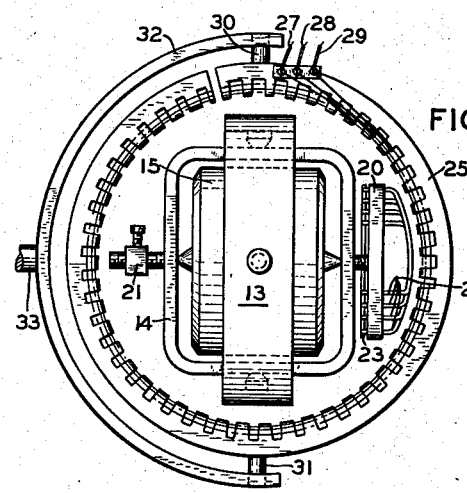
Fig. 3 is an enlarged detail plan view of the gyro unit of the instrument and its control element.
Figure 6:
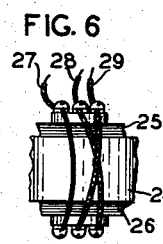
Fig. 6 is a detail side elevation illustrating the wiring connections employed in the stator unit.
Figure 4:
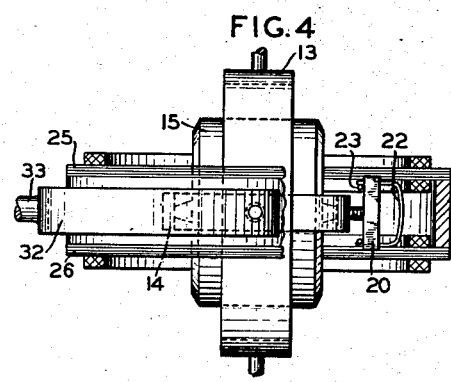
Fig. 4 is a side elevation view of the parts shown in Fig. 3.

The field flux providing coil member linking the inductor is constructed in two separately functioning electrical parts and is employed, in the present instance, as the stator member of the electromagnetic couple. The double wound stator illustrated is placed on a single frame 24. Two separate and parallel flux fields are produced by the respective circular coil elements of the stator or spaced fields which include the upper and lower concentric, pole including rings 25 and 26, each having a plurality of inwardly facing poles. The cores are polyphase wound to produce a moving unidirectional flux field when energized by a suitable polyphase source (not shown). Three phase windings are preferably employed, energy being supplied through leads 27, 28 and 29. As shown in Fig. 6, two of the leads between the circular, parallel, coil elements are reversed so that the upper windings produce, for example, a unidirectionally moving field, as viewed in Fig. 3, which travels in a clockwise direction and the lower windings produce a similar field which travels in a counterclockwise direction. The normal position of the linking portion 22 of the inductor with respect to the double wound stator is shown in Fig. 4 in which the same is situated midway between the spaced moving flux fields of the two stators and is consequently not influenced thereby. The separately functioning coil stator members are disposed in parallel planes equidistantly spaced above and below the normal horizontal plane defined by the spin axis of the gyro rotor 15 and the horizontal axis of the rotor bearing frame 14.

The stator frame 24 surrounds the gyro instrument and is universally mounted by means of trunnions 30 and 31 which extend therefrom, the trunnions being suitably journaled in a U-shaped frame 32 which is pivotally supported on a single trunnion 33 perpendicularly situated with respect to trunnions 30—31. Trunnion 33 is journaled in a bearing 34 mounted on a post 35 situated within the casing 10. As shown, the universally supported stator frame 24 is stabilized in a normally horizontal plane by a gyro vertical instrument situated within the casing 10, as hereinafter described. Alternatively, the stator frame may be kept horizontal by making the same pendulous about its axes of support.

The gyro vertical instrument shown employed for this purpose is shown as of conventional form and includes a gimbal ring 36 whose aft pivot is provided by trunnion 33 and bearing 34. To provide stabilization about the trunnion 30—31 axis of the frame 24, a connecting linkage is employed which includes arms 37, 38 and 39. Arm 39 is rigidly mounted on an extending portion of one of the athwartship trunnions, as indicated at 40, by which the gyro rotor case 46 is pivotally located upon the gimbal ring 36. A counterweight 41 may be employed to balance the weight of the linkage system formed by arms 37, 38 and 39.

Figure 5:
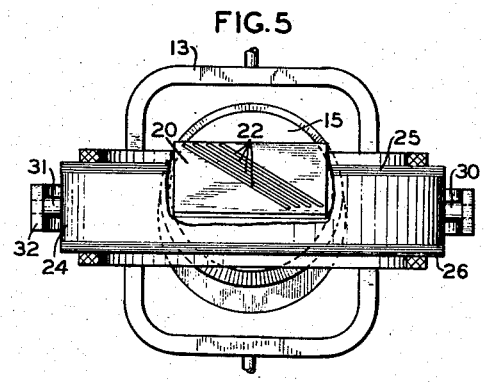
Fig. 5 is a position view similar to Fig. 4 and at right angles to the same in which the gyro rotor bearing frame is shown inclined about its horizontal axis.
Figure 9:
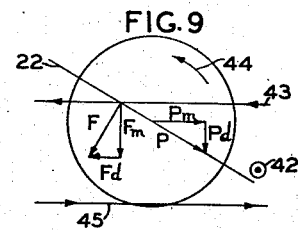
Figure 10:
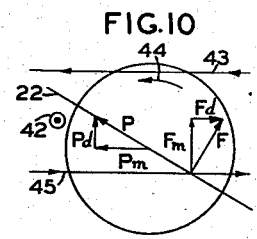

Normally, the spin axis of the gyro compass rotor 15 and the axis of the rotor bearing frame define a horizontal plane of reference which is situated with relation to the coupling means, as shown in Fig. 4, so that the linking inductors 22 are midway between the rotating fields produced by the coil members. As the frame 14 begins to tilt about its horizontal axis due to rotation of the earth, the frame assumes a position, as shown exaggerated in Fig. 5, in which the inductor 22 comes more within the influence of the moving field produced by the upper stator coils on the frame 24. When the instrument is located north of the Equator, the north end of the gyro spin axis tends to turn towards the east and rise as the earth rotates. Such a position is shown diagrammatically in Fig. 9, in which the meridian position, with respect to which the gyro spin axis should be maintained parallel, is indicated at 42. The inductor 22 then links the upper rotating flux field, represented by a line at 43, the field moving in the direction indicated by the arrow. A current is consequently induced in the inductor producing a force between the coupled parts that is at right angles to the inductor where it links the flux field and is represented by the line designated at F in Fig. 9. The rod 22 is inclined with respect to the flux field so that a vertical component $F_m$ and a horizontal component $F_d$ of force F are obtained which are respectively effective to cause precession in the direction indicated by the lines $P_m$ and $P_d$. The direction of spin of the gyro rotor is shown by the arrow 44. The torque produced by the force $F_m$ is exerted about the horizontal axis of the rotor frame and causes precessional movement of the vertical ring 13 of the instrument in a direction to move the spin axis of the rotor towards the meridian. The torque produced by the force $F_d$ is exerted about the axis of the vertical ring 13 and causes precessional movement of the rotor frame 14 in the indicated direction to reduce the tilt and thereby damp movement of the gyro instrument. Due to gyroscopic momentum, the spin axis of the gyro will swing past the meridian to assume a position shown diagrammatically in Fig. 10, wherein the inductor links the lower of the rotating flux fields of the stator as indicated by the straight line 45. This field is traveling in the opposite direction, to the field of the upper coil member of the stator, as shown by the arrow, and the resultant forces and precession movement of the gyro instrument caused by the same are shown in a manner similar to the showing of the same in Fig. 9. In Fig. 10, the direction of the resultant movements are reversed so that the spin axis of the gyro rotor is caused to again move towards the meridian 42, and its tilt is reduced, this action continuing until the spin axis of the rotor comes to rest substantially level and on the meridian.

Figure 8:
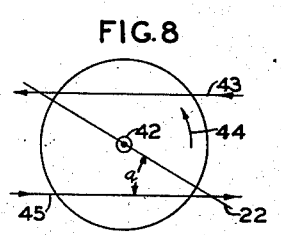
Figs. 8, 9 and 10 are diagrammatic force diagrams showing the manner in which the gyro compass is controlled during operation.

As shown in Fig. 8, the angle $a$ made between the curved inductor rod 22 and the respective flux fields 43 and 45 is fixed and a constant ratio between the torques respectively imparting direction seeking and damping properties to the instrument is obtained. By changing the angle $a$, different constant ratios of the simultaneously effective torque effort may be obtained, as desired. When the limiting positions are approached as, for instance, when angle $a$ is made zero, the damping torque is eliminated. Also, if the angle is made substantially 90 degrees, the coupling means is then only effective to eliminate tilt and the instrument becomes a directional gyroscope without meridian-seeking properties. The invention contemplates the utilization of the electromagnetic couple described for either or both of the noted purposes, but preferably the angle a is made acute so that both direction seeking and damping factors are simultaneously introduced to control the gyro compass instrument.

Figure 7:
Fig. 7 is a detail front view of a modified form of inductor.

By curving the inductor rods 22, as shown in Fig. 7, the ratio of the torque forces exerted about the horizontal and vertical axes of the gyro may be varied as desired in accordance with the extent of inclination of the gyro rotor frame about its axis. Another obvious manner of varying the strength of the torque forces would be to change the strength of the respective flux fields of the stator.

As many changes could be made in the above construction and many apparently widely different embodiments of this invention could be made without departing from the scope thereof, it is intended that all matters contained in the above description or shown in the accompanying drawings shall be interpreted as illustrative and not in a limiting sense.

What is claimed is:

1. A gyro compass instrument including a gyro having vertical and horizontal axes of free support, and electromagnetic coupling means for giving both direction seeking and damping factors to said gyro comprising an inductor mounted on the gyro and lying in the same horizontal plane as said horizontal axis, and an independently mounted double wound stator concentric with said inductor and formed of two, circularly shaped, parallel, coil members which respectively provide, oppositely directed, moving flux fields, said inductor being normally situated mid-way between said coil members.

2. A gyro compass comprising, in combination, a gyro having vertical and horizontal axes of free support, a direction indicating element controlled by the gyro, and electromagnetic coupling means consisting of an independently mounted, double wound, stator formed of two, circularly shaped, parallel, coil members which provide, oppositely directed, moving flux fields, and a displaceable inductor mounted on said gyro linking either one or the other of said coil members, upon tilt of the gyro, to exert a torque about both the horizontal axis of the gyro to cause a direction seeking precessional movement thereof and the vertical axis of the gyro to cause a damping precessional movement thereof.

3. A gyro compass comprising, in combination, a gyro including a gyro rotor member, a frame carrying said rotor for spinning and pivoted for movement about a horizontal axis normal to said spin axis, a ring for pivoting said rotor bearing frame about a vertical axis, a direction indicating means controlled by the ring, electromagnetic coupling means for simultaneously effecting a direction seeking precession of the ring and a damping precession of the frame including a torque-exerting rod-shaped inductor mounted on said frame and a double wound stator cooperating therewith, independently mounted on a stabilized universal support, formed by two circularly shaped, parallel, coil members concentric of said vertical axis, one of which is positioned above the horizontal axis of the frame and the other of which is positioned below the horizontal axis of the frame, said upper coil member being wound to produce a unidirectional flux field moving in one direction and said lower coil member being wound to produce a unidirectional flux field moving in the opposite direction, and means for energizing said stator.

4. A gyro compass comprising, in combination, a gyro including a gyro rotor, a frame carrying said rotor for spinning and pivoted for movement about a horizontal axis normal to said spin axis and on which the rotor is mounted to spin about a normally horizontal axis, a ring for pivoting said rotor bearing frame about a vertical axis, a direction indicating means controlled by the ring, electromagnetic coupling means consisting of a double wound stator having two parallel, circularly shaped, coil members concentric of said vertical axis to respectively produce oppositely directed, moving flux fields, independent mounting means for said stator whereby one of the coil members thereof is normally positioned in a parallel plane above the plane defined by the rotor and rotor frame axes of the gyro and the other coil member is positioned below the defined plane, an inductor on said bearing frame linking either one or the other of said coil members, upon tilt of the frame about its axis, to exert a torque about both the axis of the frame to cause a direction seeking precessional movement of the ring and the axis of the ring to cause a damping precessional movement of the frame, and means for energizing said stator.

5. In a gyro compass, a rotor bearing frame mounted in neutral equilibrium for freedom about horizontal and vertical axes, a universally gimballed normally horizontal circular winding surrounding said frame and lying substantially in the plane of said horizontal axis, a cooperative member on said frame whereby torque is exerted about the horizontal axis of said frame upon tilt thereof about said horizontal axis, and a gyro-vertical connected to said circular winding for stabilizing the same.

6. A gyro compass as claimed in claim 5, wherein said winding and cooperating member are included so that upon relative tilt of said frame and winding a torque is exerted on said frame about both the horizontal and vertical axes thereof, whereby both meridian seeking and damping properties are imparted to the gyro compass.

7. A gyroscopic compass mounted for freedom about vertical and horizontal axes, a two-part electromagnetic inductive coupling means surrounding said gyro compass and lying in the horizontal plane of said horizontal axis, one part of said coupling means being mounted on said gyro compass and the other part having an independent universal mounting concentric therewith, and one of said parts comprising an inductor and the other a two-part coil member wound to provide two vertically spaced, parallel, oppositely directed moving flux fields between which the inductor is normally positioned, whereby, upon relative tilt of said two-part electromagnetic coupling, a torque is exerted on said compass about its horizontal axis.

8. A gyro compass as claimed in claim 7, in which one of the parts of said electromagnetic coupling means lies at an acute angle to the horizontal, whereby the resulting torque on the gyroscope has both horizontal and vertical components to impart both meridian-seeking and damping properties to the compass.

ORLAND E. ESVAL.

CERTIFICATE OF CORRECTION.

Patent No. 2,342,655. February 29, 1944.

ORLAND E. ESVAL.

It is hereby certified that error appears in the printed specification of the above numbered patent requiring correction as follows: Page 3, second column, line 43-44, claim 6, for "included" read --inclined--; and that the said Letters Patent should be read with this correction therein that the same may conform to the record of the case in the Patent Office.

Signed and sealed this 16th day of May, A. D, 1944.

Leslie Frazer (Seal)           Acting Commissioner of Patents.